March 20, 1928.  C. HEDDON  1,663,080

FISH BAIT

Filed May 29, 1926

Inventor
Charles Heddon
by
Attys.

Patented Mar. 20, 1928.

1,663,080

UNITED STATES PATENT OFFICE.

CHARLES HEDDON, OF DOWAGIAC, MICHIGAN, ASSIGNOR TO JAMES HEDDON'S SONS, OF DOWAGIAC, MICHIGAN, A CORPORATION OF MICHIGAN.

FISH BAIT.

Application filed May 29, 1926. Serial No. 112,590.

The bait of the present invention is designed to simulate the appearance of a natural frog, and, at the same time, to incorporate into the structure of the bait certain features which have heretofore been applied solely to minnow baits of the character largely in use at the present time for the luring of fresh water game fishes.

The bait of the present invention is intended, by its configuration, to so re-act against the pressure of the water when the line is being retrieved so as to cause the bait to dart from side to side and otherwise simulate the action of a live bait, and, at the same time, when at rest, to assume the oblique position naturally occupied by a live frog when resting with its legs dangling downwardly and its head elevated above the surface.

Furthermore, the configuration of the rear portion of the bait not only is intended to simulate the separated legs of a frog, but this arrangement is of particular value in that it provides a guard for the sides of the hook which tends, in considerable measure, to prevent fouling of the hook without in any way detracting from the natural appearance of the bait as a whole. The invention in particular relates to the formation and arrangement of the bait in such a way as to afford a preponderance of weight at a point to the rear of the center of buoyancy, so that when the bait is at rest, it will assume the oblique position previously referred to in conjunction with the means provided for insuring movement in a bait having the weight thus distributed.

Figure 3:
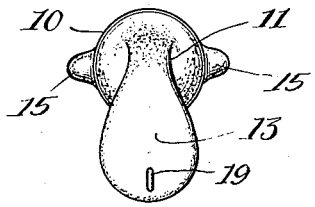
Fig. 3 is a front elevation thereof.

The bait comprises a body portion 10 which, as indicated in Fig. 3, is of substantially circular form in cross section at the middle portion thereof, and which tapers forwardly and merges into a contracted neck 11, which in turn merges into a head 12 which extends obliquely downward from the body, and is rounded on its under surface and flat on its upper or front portion 13. The flattening of the front extends upwardly to the neck of the bait and, when the bait is being retrieved and lying horizontally, this front surface presents an obliquely disposed flat area for impingement against the water which causes a pressure at this point which will be relieved by the back flow of the water laterally around the sides of the neck, thereby occasioning a condition of unstable equilibrium, which will cause the bait to dart from side to side in simulation of the natural movements of a live bait swimming through the water.

Figure 1:
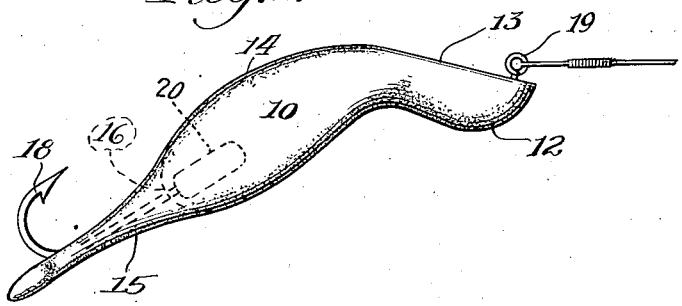
Figure 1 is a side elevation of the bait showing the position assumed when at rest.
Figure 2:
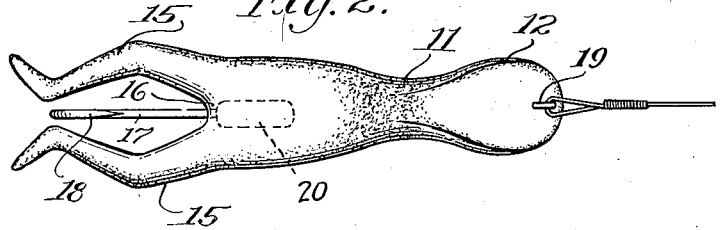
Fig. 2 is a top or plan view of the bait.

The belly and back portions of the body are tapered rearwardly, at what might be termed the thigh portion 14 of the bait, which is the portion thereof which merges into the legs 15—15, and the body portion of the bait through the crotch portion 16 thereof is rounded, as indicated in Fig. 1, giving to the body as a whole, exclusive of the legs, an elongated pear shaped formation. The shank of the hook 17 is entered into the crotch portion of the body and lies in substantially parallel relation with and between the legs, so that it is protected thereby with the curved barbed portion 18 extending upwardly from the plane of the legs. The line tie 19 is mounted at a point slightly above the extreme tip of the head, which position of the line tie assists in developing the unstable condition of equilibrium during retrieving which results in the darting and dipping movements of the bait when in action.

The bait as a whole is of buoyant character, but in order to properly distribute the mass in such a way as to cause the bait to assume the oblique resting position indicated in Fig. 1, suitable provision is made for locating a preponderance of the mass at a point to the rear of the center of buoyancy. This may be accomplished by the use of a lead insert 20 into a body composed of relatively buoyant material, such as wood or the like, or by otherwise adequately weighting the bait, or coring out the forward portion thereof with a view of displacing the center of mass to a point behind the center of buoyancy.

This method of distributing the mass will cause the bait, when at rest, to assume the natural position of a resting frog, but when the bait is being retrieved, the pull of the line and the resistance of the water will straighten out the bait, so that it will trail freely in a substantially horizontal position, thereby simulating the appearance of a swimming frog.

Furthermore, by disposing the preponderance of weight at the leg end of the bait, which becomes the out going end during the casting operation, the bait will cast readily and maintain its proper position until it strikes the water after which it will settle momentarily into a natural oblique position until retrieving begins.

The present bait is designed to possess many of the advantageous features of a wooden minnow bait combined with the special or peculiar natural features of a live frog, and in particular to utilize the leg portions as a suitable and adequate guard for the hook. Also by disposing the head in oblique relation to the body, or otherwise providing for a flattening of the forward surface, and preferably reducing the width of the neck, adequate provision is made for imparting a life like motion to the bait, despite the weighting of the rear end of the bait and the division of the trailing legs, both of which are factors tending to hold the bait in a straight line of movement, which tendency, however, is adequately compensated for and overcome by the form of the forward end of the bait in the manner indicated.

This gives to the bait as a whole not only the general appearance of a natural frog, but utilizes such features of configuration in a way which will perform the mechanical functions required in imparting to such a bait the degree of movement necessary to simulate the natural movements of the frog when swimming. Also by arranging the line tie at a point which, when the bait is trailing through the water, will lie below the center of resistance, the darting effect will be accentuated, and such position of the line tie, in conjunction with the oblique disposition of the forward impinging end, will advantageously influence the action of the bait in overcoming its tendency to trail in a straight line by reason of the configuration of its rear end and the disposition of the weight.

I claim:

1. A bait consisting of a body and a head connected with the body by a neck of reduced transverse diameter as compared with the transverse diameters of the head and body, the neck and head extending obliquely downward with respect to the longitudinal axis of the body, the upper surface of the head being flattened substantially from the tip thereof to the point of mergence into the neck to afford an obliquely presented area of impingement adequate to impart life-like movements to the bait when the bait is in trailing position, and the body being divided at its rear end to simulate the legs of a frog, substantially as described.

2. A bait consisting of a body and a head connected with the body by a neck of reduced transverse diameter as compared with the transverse diameters of the head and body, the neck and head extending obliquely downward with respect to the longitudinal axis of the body, the upper surface of the head being flattened substantially from the tip thereof to the point of mergence into the neck to afford an obliquely presented area of impingement adequate to impart life-like movements to the bait when the bait is in trailing position, the body being divided at its rear end to simulate the legs of a frog, and the preponderance of mass being located to the rear of the center of buoyancy, substantially as described.

3. A bait consisting of a body and a head connected with the body by a neck of reduced transverse diameter as compared with the transverse diameters of the head and body, the neck and head extending obliquely downward with respect to the longitudinal axis of the body, the upper surface of the head being flattened substantially from the tip thereof to the point of mergence into the neck to afford an obliquely presented area of impingement adequate to impart life-like movements to the bait when the bait is in trailing position, the body being divided at its rear end to simulate the legs of a frog, and the preponderance of mass being located to the rear of the center of buoyancy, and a line-tie at the forward end of the bait located in position to lie below the center of resistance when the bait occupies its trailing position in retrieving, substantially as described.

4. A bait consisting of a body and a head connected with the body by a neck of reduced transverse diameter as compared with the transverse diameters of the head and body, the neck and head extending obliquely downward with respect to the longitudinal axis of the body, the upper surface of the head being flattened substantially from the tip thereof to the point of mergence into the neck to afford an obliquely presented area of impingement adequate to impart life-like movements to the bait when the bait is in trailing position, and the body being divided at its rear end to simulate the legs of a frog, and a line-tie at the forward end of the bait located in position to lie below the center of resistance when the bait occupies its trailing position in retrieving, substantially as described.

5. A bait consisting of a body of generally pear-shaped formation and a head rounded on its under side and connected with the body by a neck of reduced transverse diameter as compared with the transverse diameters of the head and body, the neck and head extending obliquely downward with respect to the longitudinal axis of the body, the upper surface of the head being flattened substantially from the tip thereof to the point of mergence into the neck to afford an obliquely presented area of impingement adequate to impart life-like movements to the bait when the bait is in trailing position, and the body being divided at its rear end to simulate the legs of a frog, substantially as described.

6. A bait consisting of a body of generally pear-shaped formation and a head rounded on its under side and connected with the body by a neck of reduced transverse diameter as compared with the transverse diameters of the head and body, the neck and head extending obliquely downward with respect to the longitudinal axis of the body, the upper surface of the head being flattened substantially from the tip thereof to the point of mergence into the neck to afford an obliquely presented area of impingement adequate to impart life-like movements to the bait when the bait is in trailing position, the body being divided at its rear end to simulate the legs of a frog, and the preponderance of mass being located to the rear of the center of buoyancy, substantially as described.

7. A bait consisting of a body of generally pear-shaped formation and a head rounded on its under side and connected with the body by a neck of reduced transverse diameter as compared with the transverse diameters of the head and body, the neck and head extending obliquely downward with respect to the longitudinal axis of the body, the upper surface of the head being flattened substantially from the tip thereof to the point of mergence into the neck to afford an obliquely presented area of impingement adequate to impart life-like movements to the bait when the bait is in trailing position, the body being divided at its rear end to simulate the legs of a frog, and the preponderance of mass being located to the rear of the center of buoyancy, and a line-tie at the forward end of the bait located in position to lie below the center of resistance when the bait occupies its trailing position in retrieving, substantially as described.

8. A bait consisting of a body of generally pear-shaped formation and a head rounded on its under side and connected with the body by a neck of reduced transverse diameter as compared with the transverse diameters of the head and body, the neck and head extending obliquely downward with respect to the longitudinal axis of the body, the upper surface of the head being flattened substantially from the tip thereof to the point of mergence into the neck to afford an obliquely presented area of impingement adequate to impart life-like movements to the bait when the bait is in trailing position, and the body being divided at its rear end to simulate the legs of a frog, and a line-tie at the forward end of the bait located in position to lie below the center of resistance when the bait occupies its trailing position in retrieving, substantially as described.

9. A bait consisting of a body of generally pear-shaped formation and a head rounded on its under side and connected with the body by a neck of reduced transverse diameter as compared with the transverse diameters of the head and body, the neck and head extending obliquely downward with respect to the longitudinal axis of the body to a point outside of the greatest transverse sectional plane of the body, the upper surface of the head being flattened substantially from the top thereof to the point of mergence into the neck to afford an obliquely presented area of impingement adequate to impart life-like movements to the bait when the bait is in trailing position, and the body being divided at its rear end to simulate the legs of a frog, substantially as described.

10. A bait consisting of a body of generally pear-shaped formation and a head rounded on its under side and connected with the body by a neck of reduced transverse diameter as compared with the transverse diameters of the head and body, the neck and head extending obliquely downward with respect to the longitudinal axis of the body to a point outside of the greatest transverse sectional plane of the body, the upper surface of the head being flattened substantially from the top thereof to the point of mergence into the neck to afford an obliquely presented area of impingement adequate to impart life-like movements to the bait when the bait is in trailing position, the body being divided at its rear end to simulate the legs of a frog, and the preponderance of mass being located to the rear of the center of buoyancy, substantially as described.

11. A bait consisting of a body of generally pear-shaped formation and a head rounded on its under side and connected with the body by a neck of reduced transverse diameter as compared with the transverse diameters of the head and body, the neck and head extending obliquely downward with respect to the longitudinal axis of the body to a point outside of the greatest transverse sectional plane of the body, the upper surface of the head being flattened substantially from the top thereof to the point of mergence into the neck to afford an obliquely presented area of impingement adequate to impart life-like movements to the bait when the bait is in trailing position, the body being divided at its rear end to simulate the legs of a frog, and the preponderance of mass being located to the rear of the center of buoyancy, and a line-tie at the forward end of the bait located in position to lie below the center of resistance when the bait occupies its trailing position in retrieving, substantially as described.

12. A bait consisting of a body of generally pear-shaped formation and a head rounded on its under side and connected with the body by a neck of reduced transverse diameter as compared with the transverse diameters of the head and body, the neck and head extending obliquely downward with respect to the longitudinal axis of the body to a point outside of the greatest transverse sectional plane of the body, the upper surface of the head being flattened substantially from the top thereof to the point of mergence into the neck to afford an obliquely presented area of impingement adequate to impart life-like movements to the bait when the bait is in trailing position, the body being divided at its rear end to simulate the legs of a frog, and a line-tie at the forward end of the bait located in position to lie below the center of resistance when the bait occupies its trailing position in retrieving, substantially as described.

CHARLES HEDDON.